United States Patent Office 3,610,104
Patented Oct. 5, 1971

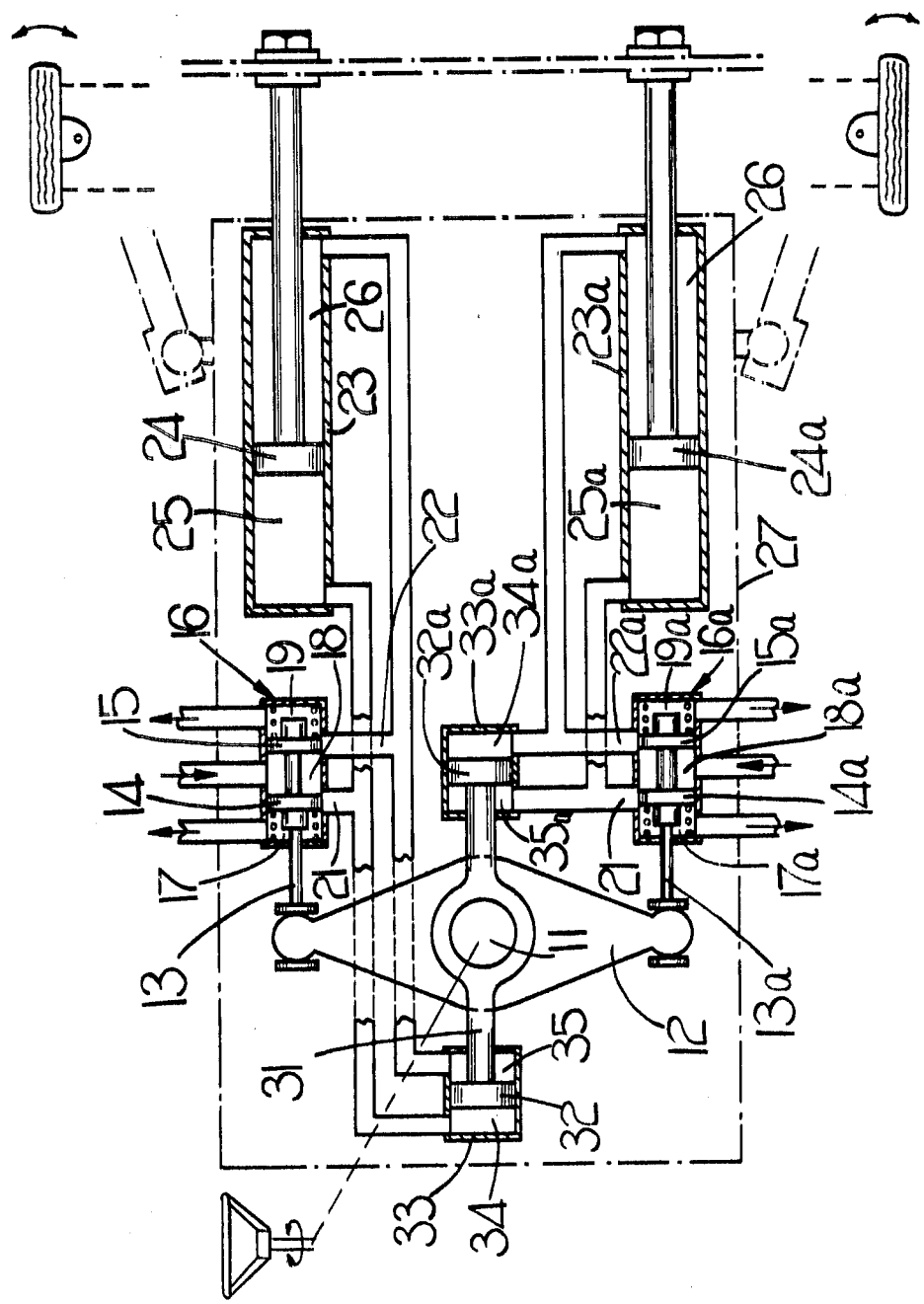

3,610,104
POWER ASSISTED STEERING SYSTEMS FOR ROAD VEHICLES
William Frank Hill, Stafford, England, assignor to Joseph Lucas (Industries) Limited, Birmingham, England
Filed June 27, 1969, Ser. No. 837,029
Claims priority, application Great Britain, July 2, 1968, 31,456/68
Int. Cl. F15b 11/00
U.S. Cl. 91—411  1 Claim

ABSTRACT OF THE DISCLOSURE

A power assisted steering system for a vehicle has two independently operated servo systems operating the steering mechanism of the vehicle and a feedback network for providing feel to the steering wheel, the feel when the wheel is turned clockwise being provided principally by one of the servo systems and the feel when the wheel is turned anti-clockwise being provided principally by the other servo system. In this way a warning is given if either servo system fails because it becomes more difficult to steer the vehicle in one direction than the other.

This invention relates to power assisted steering systems for vehicles.

A power assisted steering system according to the invention comprises two independently operated servo systems operating the steering mechanism of the vehicle, and a feedback network for providing feel to the steering wheel, the feel when the wheel is turned clockwise being provided principally by one of the servo systems and the feel when the wheel is turned anti-clockwise being provided principally by the other servo system.

It is common in power assisted steering mechanisms to provide feedback giving a feel to the steering wheel. It is also known to provide two independent servo systems operating the steering mechanism, together with some convenient forms of warning means to give an indication if either servo system should fail. Such an arrangement has the disadvantage that the warning means could fail before either servo system, so that no warning would be given in the event of a failure. By an arrangement in accordance with the invention, the driver will be warned when either servo system fails, because the effort required to turn the wheel in opposite angular directions will be perceptibly different. Preferably the servo systems provide 75% and 25% respectively of the feel when the wheel is turned anti-clockwise, and 25% and 75% respectively of feel when the wheel is turned clockwise, but it is possible for one servo system only to provide the feel in each direction.

The accompanying drawing is a diagrammatic representation of one example of the invention.

Referring to the drawing, the steering wheel of a road vehicle operates in conventional manner through the steering shaft to impart angular movement to a drop arm which at its lower end has secured thereto a ball 11 which is in driving engagement with a lever 12, so that angular movement of the steering wheel imparts to the lever 12 longitudinal movement parallel to the axis of the road vehicle. The ends of the lever 12 are drivingly connected to a pair of piston rods 13, 13a associated respectively with a pair of independent power assisted steering systems.

Associated with the rod 13 are a pair of pistons 14, 15 moving in a cylinder 16 so as to divide the cylinder into chambers 17, 18 and 19. Springs in the end chambers 17 and 19 load the piston rod 13 to its central position, in which the chamber 18 is coupled to a pump, and the chambers 17 and 19 are connected to a reservoir. In this position a pair of outlets 21 and 22 from the cylinder 16 are blocked by the pistons 14 and 15, and there is a small leakage of liquid past the pistons 14 and 15 from the chamber 18 to the chambers 17 and 19.

There is further provided a steering cylinder 23 having therein a piston 24 dividing the cylinder into chambers 25 and 26 coupled respectively to the outlets 21 and 22. The piston 24 is connected to a fixed part of the vehicle, and a cylinder 27 in which the entire arrangement shown is contained is coupled to the road wheels so that longitudinal movement of the cylinder 27 effects steering of the vehicle.

Connected to the drop arm is a lever 31 having at its end a pair of pistons 32, 32a. The piston 32 is housed in a cylinder 33 and divides the cylinder 33 into chambers 34 and 35 in communication with the outlets 21 and 22 respectively. The piston 32a is contained in a cylinder 33a and divides the cylinder 33a into chambers 34a and 35a.

Ignoring the second steering system for the moment, when the steering wheel is moved to negotiate a right turn, the lever 12 moves to the right as shown in the drawings so that the chamber 18 is placed in communication with the outlet 22 and the outlet 21 is placed in communication with exhaust. Liquid can flow from the pump through the chamber 18 and outlet 22 to the chamber 26, and from the chamber 25 through the outlet 21 to the reservoir, so that the cylinder 23 moves to the right to effect the required steering, movement halting when the piston 13 re-assumes the position shown in the drawing. During this steering movement, the driver will experience a feedback force through the lever 12, this force being the result of the pressure from the pump acting on the smaller area of the piston 32, so tending to move the piston 32 to the left.

Assuming that a left-hand turn is being negotiated, the outlet 21 is placed in communication with the chamber 18, and the cylinder 23 moves to the left. The restoring force which applies a feedback to the steering wheel is a result of the pump pressure acting on the larger area of the piston 32, tending to move the piston 32 to the right. It will be seen, therefore, that when a left-hand turn is being negotiated, there will be a substantially greater feedback than when a right-hand turn is being negotiated. If the system so far described was working on its own, the effect of this would be felt by the driver immediately.

The second system is substantially the same as the first system, and equivalent parts have been indicated with the same reference numerals, but with the suffix a. It will be noted, however, that whereas the outlet 22 is coupled to the smaller side of its piston 32, the outlet 22a is coupled to the larger side of its piston 32a. Similarly, the outlet 21 is coupled to the larger side of its piston 32, whereas the outlet 31a is coupled to the smaller side of its piston 32a. It will readily be seen that, considering the second system only, the restoring force exerted on the piston 32a and thence to the steering wheel is substantially larger for a right-hand turn than for a left-hand turn.

When both systems are operating satisfactorily, then the feel imparted to the steering wheel will be the same no matter which direction the wheel is turned, because for either direction of turn the total restoring force acting on the pistons 32a and 32 will be equal to the pump pressure acting on the larger area of one piston plus the pressure of the other pump acting on the smaller area of the other piston. There may of course be very small variations in the pressures of the two pumps, but these will not be noticeable to the driver. When either system fails, the feel imparted on the left- and right-hand turns will be substantially different, so giving the required warning.

The areas of the various pistons and cylinder, must of course be matched to give satisfactory overall performance to the system, and the drawings are purely diagrammatic in the respect. In a specific example where the larger and smaller areas of the pistons 24, 24a (i.e. the area exposed to chambers 25, 25a and 26, 26a) are A1 and A2, then the piston 32 has large and small areas $\frac{3}{8}$A1 and $\frac{1}{8}$A2, while the piston 32a has large and small areas $\frac{3}{8}$A2 and $\frac{1}{8}$A1.

Having thus described my invention, what I claim as new and desire to secure by Letters Patent is:

1. A power assisted steering system for a vehicle including a pair of independently operated servo systems together operating the servo mechanism of the vehicle under the control of a steering wheel of the vehicle, a pair of feedback devices providing feel at the steering wheel dependent upon the forces acting on the steered wheels of the vehicle, said feedback devices each including a ram mechanism subject to the servo pressure of a respective servo system, and the feel during clockwise rotation of the steering wheel being principally provided by one of said feedback devices, while the feel during anti-clockwise rotation of the steering wheel is provided principally by the other of said feedback devices.

References Cited
UNITED STATES PATENTS

| | | | |
|---|---|---|---|
| 2,730,075 | 1/1956 | Edge et al. | 91—434 |
| 3,439,768 | 4/1969 | Medley | 60—52 S |
| 3,509,958 | 5/1970 | Lang | 60—52 S |

CORNELIUS J. HUSAR, Primary Examiner

U.S. Cl. X.R.

60—52